US010467774B2

(12) United States Patent
Gruber et al.

(10) Patent No.: US 10,467,774 B2
(45) Date of Patent: Nov. 5, 2019

(54) MEMORY ADDRESS FLIPPING TO DETERMINE DATA CONTENT INTEGRITY IN GPU SUB-SYSTEM

(71) Applicant: QUALCOMM Incorporated, San Diego, CA (US)

(72) Inventors: Andrew Evan Gruber, Arlington, MA (US); Rahul Gulati, San Diego, CA (US); Brendon Lewis Johnson, San Diego, CA (US); Jay Chunsup Yun, Carlsbad, CA (US); Alex Kwang Ho Jong, San Diego, CA (US); Donghyun Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 15/804,707

(22) Filed: Nov. 6, 2017

(65) Prior Publication Data
US 2019/0139263 A1    May 9, 2019

(51) Int. Cl.
*G06K 9/00* (2006.01)
*G09G 5/39* (2006.01)
(Continued)

(52) U.S. Cl.
CPC .................. *G06T 7/97* (2017.01); *B60R 1/00* (2013.01); *G06F 11/1004* (2013.01); *G06K 9/00791* (2013.01); *G08G 1/167* (2013.01); *G09G 5/363* (2013.01); *G09G 5/39* (2013.01); *B60R 2300/303* (2013.01); *G09G 2358/00* (2013.01); *G09G 2380/10* (2013.01)

(58) Field of Classification Search
USPC ........ 382/100, 103–104, 106, 113, 155, 162, 382/168, 173, 181, 189, 194, 199, 206, 382/209, 219, 224, 232, 254, 274, 276, 382/286–291, 305; 718/1; 345/506, 520, 345/531
See application file for complete search history.

(56) References Cited

U.S. PATENT DOCUMENTS 8,082,472 B2    12/2011  Liu
2013/0268934 A1*  10/2013  Gonzalvo ............... G06F 21/54
                                                   718/1
(Continued)

OTHER PUBLICATIONS

International Search Report and Written Opinion—PCT/US2018/059258—ISA/EPO—dated Jan. 21, 2019, 15 pp.

*Primary Examiner* — Seyed H Azarian
(74) *Attorney, Agent, or Firm* — Shumaker & Sieffert, P.A.

(57) ABSTRACT

Techniques of this disclosure may include processing data using one or more processors to produce a first image, including storing intermediate first results of processing the data in at least one internal memory of the one or more processors according to a first memory access pattern, processing the data using the one or more processors to produce a second image, including storing intermediate second results of processing the data in the at least one internal memory of the one or more processors according to a second memory access pattern, wherein the second memory access pattern is different than the first memory access pattern, comparing the first image to the second image, and generating an interrupt if the comparison indicates that the first image is different than the second image.

28 Claims, 4 Drawing Sheets

(51) Int. Cl.
*G06T 7/00* (2017.01)
*B60R 1/00* (2006.01)
*G08G 1/16* (2006.01)
*G06F 11/10* (2006.01)
*G09G 5/36* (2006.01)

(56) References Cited

U.S. PATENT DOCUMENTS

| | | |
|---|---|---|
| 2014/0181594 A1 | 6/2014 | Sridharan et al. |
| 2015/0304648 A1 | 10/2015 | Gulati et al. |
| 2016/0071231 A1* | 3/2016 | Bargh .................. G09G 5/36 345/520 |
| 2016/0379331 A1* | 12/2016 | Krutsch ................ G06T 15/005 345/506 |
| 2017/0094268 A1* | 3/2017 | Gulati .................... G09G 3/006 |
| 2017/0177458 A1* | 6/2017 | Viggers ............... G06F 11/2236 |

* cited by examiner

FIG. 1

FIG. 2

MEMORY ADDRESS FLIPPING TO DETERMINE DATA CONTENT INTEGRITY IN GPU SUB-SYSTEM

TECHNICAL FIELD

The disclosure relates to testing of a display subsystem for data content integrity.

BACKGROUND

Graphics processing units (GPUs) are processing circuits configured to perform many operations in parallel and are useful for graphics operations that generate image data for display. GPUs are used in a variety of environments including automobiles. For instance, a GPU generates image content, such as image content displayed on an instrument panel behind the steering wheel, image content used as warning indicators, image content related to infotainments screens, image content from a rearview camera, and other image content for other automotive display systems. A display device in an automobile may be part of, or operably coupled to, an automotive advanced driver assistance system (ADAS) such that the display device may also display blind spot warnings to alert the driver that there are vehicles situated at the driver's blind spot.

A safety critical ADAS may be required to fulfill functional safety requirements, such as those mandated by ISO 26262 (functional safety standard for road vehicles). One functional safety requirement is to ensure data content integrity for one or more areas of image data sent to a display. A failure to display correct image data may lead to a violation of defined safety goals for an automotive application. Example automotive applications that may use displays include a rearview camera system, front collision warning systems, traffic sign recognition systems, parking assistance systems, instrument cluster displays providing so-called "tell-tale" sign information, etc.

SUMMARY

In general, aspects of the disclosure are directed to techniques for the testing of hardware, memory, and content integrity in a display subsystem. In certain applications, for example, if the display subsystem is included in, or operably coupled to, an automotive advanced driver assistance system (ADAS) or a flight control system for controlling an aircraft, the integrity of the content displayed by the display subsystem may be important to maintaining the safety of the driver and passengers of the vehicle. The display subsystem may process images and perform image operations on such images before those images are displayed by the display device. If the display subsystem is faulty and introduces errors into images during image processing, then the user may not be able to rely on the accuracy of the images that are displayed by the display device. In the example of the display device that displays the video captured by the rearview camera or displays warning or other "tell-tale" icons, the display subsystem may impact the safety of the driver and passengers, as well as pedestrians and occupants of other vehicles in a negative fashion if the display subsystem malfunctions.

The techniques of this disclosure include performing the same processing of data twice, using a graphics processing unit (GPU) or another processor, to produce two images. The GPU or other processor may be configured to store the results (e.g., intermediate results) of the processing in one or more memories using different memory access patterns. The results (e.g., intermediate results and/or the final image) may then be compared to determine if any bits of the two images are different. If so, the graphic processing sub-system may identify an error in the one or more memories (e.g., internal memories of the graphics sub-system) and issue a warning (e.g., an interrupt).

In one example of the disclosure, a method for graphics processing comprises processing data using one or more processors to produce a first image, including storing intermediate first results of processing the data in at least one internal memory of the one or more processors according to a first memory access pattern, processing the data using the one or more processors to produce a second image, including storing intermediate second results of processing the data in the at least one internal memory of the one or more processors according to a second memory access pattern, wherein the second memory access pattern is different than the first memory access pattern, comparing the first image to the second image, and generating an interrupt if the comparison indicates that the first image is different than the second image.

In another example of the disclosure, an apparatus configured for graphics processing comprises at least one internal memory and one or more processors in communication with the at least one internal memory, the one or more processors configured to process data to produce a first image, including storing intermediate first results of processing the data in the at least one internal memory according to a first memory access pattern, process the data to produce a second image, including storing intermediate second results of processing the data in the at least one internal memory according to a second memory access pattern, wherein the second memory access pattern is different than the first memory access pattern, compare the first image to the second image, and generate an interrupt if the comparison indicates that the first image is different than the second image.

In another example of the disclosure, an apparatus configured for graphics processing comprises means for processing data using one or more processors to produce a first image, including storing intermediate first results of processing the data in at least one internal memory of the one or more processors according to a first memory access pattern, means for processing the data using the one or more processors to produce a second image, including storing intermediate second results of processing the data in the at least one internal memory of the one or more processors according to a second memory access pattern, wherein the second memory access pattern is different than the first memory access pattern, means for comparing the first image to the second image, and means for generating an interrupt if the comparison indicates that the first image is different than the second image.

In another example, this disclosure describes a computer-readable storage medium storing instructions that, when executed, causes one or more processor to process data to produce a first image, including storing intermediate first results of processing the data in at least one internal memory of the one or more processors according to a first memory access pattern, process the data to produce a second image, including storing intermediate second results of processing the data in the at least one internal memory of the one or more processors according to a second memory access pattern, wherein the second memory access pattern is different than the first memory access pattern, compare the first image to the second image, and generate an interrupt if the comparison indicates that the first image is different than the second image.

The details of one or more aspects of the disclosure are set forth in the accompanying drawings and the description below. Other features, objects, and advantages of the disclosure will be apparent from the description and drawings, and from the claims.

DETAILED DESCRIPTION

Examples of this disclosure are directed to techniques, structures, and devices for testing hardware, memory, and/or data content integrity and for testing hardware and memory faults in display subsystems, such as display subsystems for safety critical use cases (e.g., instrument clusters, rearview camera application, etc.).

To ensure that the display subsystem is operating correctly without fault, a display subsystem, that may include a graphics processing unit (GPU) and/or other processors, may perform testing related to the integrity of the content to be displayed. Such testing may be used to detect operational faults that may occur while the display subsystem processes content for display by a display device. The techniques of this disclosure specifically relate to concurrent and/or online testing of content integrity for display. In this context, testing of content integrity may include testing that confirms that the content that is going to be displayed is the same as the content that was expected to be displayed. If the testing determines that the contents that is to be displayed is incorrect, such a determination may indicate hardware and/or memory problems in the display subsystem.

Concurrent testing of the display subsystem may be a continuous testing of the display subsystem while the computing device is powered on. Online testing of the display subsystem may include testing of the display subsystem while the computing device and the subsystem are powered on and performing its normal functionality. In other words, a computing device may perform testing of the display subsystem while the computing device is powered on and in use by a user without entering into a dedicated test mode, and without switching off the display device. In some examples, a computing device including a display subsystem is part of an advanced driver assistance system (ADAS) of a vehicle. The operator of the vehicle may use the ADAS to, for example, view video streamed from a rearview camera to a rearview camera display and/or view warning or tell-tale icons in an instrument cluster while the ADAS performs concurrent and online testing of the display subsystem.

Such concurrent and online testing of the display subsystem may detect operational faults of the display subsystem, which may include a blank screen, a frozen frame, or an incorrect display of image content. Operational faults may include permanent faults, intermittent faults, and transient faults. Permanent faults may be faults that remain in existence indefinitely if no corrective action is taken. Such faults may be residual design or manufacturing faults. Intermittent faults may appear, disappear, and reappear repeatedly. Such faults may be difficult to predict but their effects may be highly correlated. When such intermittent faults appear, the display subsystem may work correctly most of the time but may fail under atypical environmental conditions. Transient faults may appear and disappear quickly, and such faults may not be correlated. Such transient faults are often induced by random environmental disturbances.

A computing system configured to perform the techniques of this disclosure may perform concurrent and online testing of display content integrity in order to detect hardware and/or memory faults of the display subsystem. This disclosure describes techniques for ensuring data content integrity in display sub-systems. Example techniques of this disclosure include performing the same processing of data twice (e.g., operations for rendering or generally producing an image) using a GPU or other processor. The GPU or other processor may be configured to store the results of the processing (e.g., intermediate results) in one or more memories (e.g., internal memories of the GPU) using different memory access patterns. The results (e.g., intermediate results and/or the final image) may then be compared to determine if any bits of the two images are different. If so, the graphic processing sub-system may identify an error in the one or more memories (e.g., internal memories of the graphics sub-system) and issue a warning. The techniques of this disclosure may have application in automotive display systems, avionics display systems, or any other display system where it may be beneficial to ensure that the image data intended to be displayed is actually displayed.

As will be explained in more detail below, techniques of this disclosure may include processing data using one or more processors to produce a first image, including storing intermediate first results of processing the data in at least one internal memory of the one or more processors according to a first memory access pattern, processing the data using the one or more processors to produce a second image, including storing intermediate second results of processing the data in the at least one internal memory of the one or more processors according to a second memory access pattern, wherein the second memory access pattern is different than the first memory access pattern, comparing the first image to the second image, and generating an interrupt if the comparison indicates that the first image is different than the second image. The one or more processors (e.g., a GPU, a central processing unit (CPU), a display processor, or other processor) in this example may be a part of a computing device, such as an ADAS, and the like, or may be a standalone module that may perform the content integrity tests described throughout this disclosure.

Figure 1:
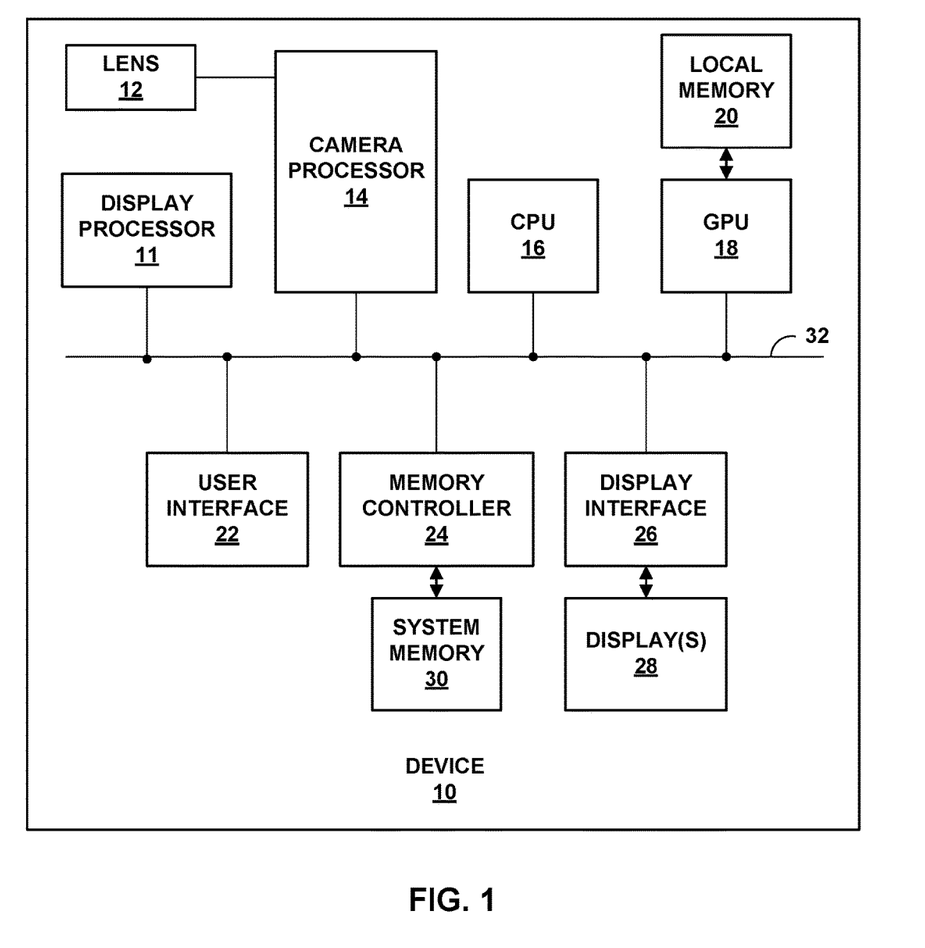
FIG. 1 is a block diagram illustrating an example computing device that may be configured to implement one or more examples of this disclosure.

FIG. 1 is a block diagram of a device configured to perform one or more of the example techniques described in this disclosure. Device 10 may be a computing device located in an automobile or other vehicle. For ease of illustration and brevity, various components of an automobile are not shown or described. Rather, FIG. 1 illustrates the components for performing example techniques described in this disclosure.

Device 10 is not limited to be an automobile. Other examples of device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone for teleconferencing, an Internet telephone, a handheld device such as a portable video game device or a personal digital assistant (PDA). Additional examples of device 10 include a personal music player, a video player, a display device, a camera, a television, a set-top box, a broadcast receiver device, a server, an intermediate network device, a mainframe computer or any other type of device that processes and/or displays graphical data. For purposes of description, the examples are described with respect to device 10 being an automobile with the understanding that the examples may be extended to other examples of device 10.

As illustrated in the example of FIG. 1, device 10 includes lens 12, camera processor 14, a central processing unit (CPU) 16, a graphical processing unit (GPU) 18 and local memory 20 of GPU 18, user interface 22, memory controller 24 that provides access to system memory 30, display processor 11, and display interface 26 that outputs signals that cause graphical data to be displayed on one or more displays 28. Bus 32 provides the interconnection of the various components.

Although the various components are illustrated as separate components, in some examples the components may be combined to form a system on chip (SoC). As an example, camera processor 14, CPU 16, GPU 18, display processor 11, and display interface 26 may be formed on a common integrated circuit (IC) chip. In some examples, one or more of camera processor 14, CPU 16, GPU 18, display processor 11, and display interface 26 may be in separate IC chips. Various other permutations and combinations are possible, and the techniques should not be considered limited to the example illustrated in FIG. 1.

The various components illustrated in FIG. 1 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 32. Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

One or more displays 28 display pertinent information to the driver or passengers. Examples of one or more displays 28 include a monitor, a liquid crystal display (LCD), a plasma display panel, a light emitting diode (LED) array, a touch panel, and the like.

In some examples, there may be only one display 28 in device 10, such as one large screen that functions as user interface 22 as well as the "dashboard" that displays information such as speed, temperature, gas level, battery level, and other such information, and outputs images captured by camera processor 14. In some examples, there may be a plurality of displays 28. For instance, one of displays 28 may be the dashboard behind the steering wheel, another one of displays 28 may be the screen that shows information such as distance traveled, temperature settings, and the like.

There may be one GPU, like GPU 18, and one display interface, like display interface 26, associated with each one of displays 28, or there may be a single GPU 18 and single display interface 26 for each one of displays 28. In the examples described in this disclosure, there is one GPU 18 and one display interface 26 for each one of displays 28. However, the example techniques are applicable also to where there are multiple ones of GPU 18 and multiple ones of display interface 26.

Display processor 11 may include one or more hardware units that retrieves images stored in system memory 30, performs one or more image processing operations on the retrieved images, and outputs the processed images to display(s) 28. In other words, display processor 11 retrieves an image from system memory 30 and may output values that cause the pixels of display(s) 28 to illuminate to display the image. In some examples, display processor 11 may be configured to perform image processing operations on the image retrieved from system memory 30 to be displayed by display(s) 28. Such image processing operations may include format converting, scaling, rotation, blending, and compositing, layering of the image with additional graphics, and the like. In general, display processor 11 may perform some operations that are generally not expected to change the content of images in some use cases (e.g., compositing operations), and may perform other operations that are generally expected to change the content of image in such use cases (e.g., by adjusting hue, saturation, brightness, etc.).

The configuration of display processor 11 in FIG. 1 is exemplary. In other examples, display processor 11 may be configured to receive visual content from any source, such as CPU 16, GPU 18, camera processor 14, or any digital signal process (DSP), video processing unit, image processing unit, pixel processing unit, memory storing visual content, or any other source.

As used herein, the term "visual content" includes but is not limited to any graphics data, graphical data, video data, image data, pixel data, graphics content, graphical content, video content, image content, pixel content, and/or any other type of content that may be displayed.

User interface 22 is used in this disclosure to generically refer to ways in which a driver or passenger may interact with device 10. For instance, user interface 22 may be switches on the side of the steering wheel that the driver may use to cycle through radio stations. User interface 22 may include the gear stick that the driver uses to shift the car into gear or reverse. In some examples, user interface 22 may be part of one or more displays 28, such as in examples where one of displays 28 is a touch panel.

Camera processor 14, CPU 16, and GPU 18 may be configured to generate image content for display by one or more displays 28. For example, camera processor 14 is configured to receive electrical currents as sensor signals from respective pixels of lens 12 and process the electrical currents to generate pixel data of images. One example of lens 12 is the backup camera of an automobile. Camera processor 14 may be configured as a single-input-multiple-data (SIMD) architecture. Camera processor 14 may perform the same operations on current received from each of the sensors on each of lens 12. Each lane of the SIMD architecture may include an image pipeline. The image pipeline includes hardwire circuitry and/or programmable circuitry (e.g., at least one of fixed-function or programmable circuitry) to process the output of the sensors to generate pixel values for pixels to be in a displayed image.

For example, each image pipeline of camera processor 14 may include respective trans-impedance amplifiers (TIAs) to convert the current to a voltage and respective analog-to-digital converters (ADCs) that convert the analog voltage output into a digital value. The current outputted by each pixel indicates the intensity of a red, green, or blue component.

In addition to converting analog current outputs to digital values, camera processor 14 may perform some additional post-processing to increase the quality of the final image. For example, camera processor 14 may evaluate the color and brightness data of neighboring image pixels and perform demosaicing to update the color and brightness of the image pixel. Camera processor 14 may also perform noise reduction and image sharpening, as additional examples. Camera processor 14 outputs the resulting images (e.g., pixel values for each of the image pixels) to system memory 30 via memory controller 24.

CPU 16 may comprise a general-purpose or a special-purpose processor that controls operation of device 10. A user may provide input to device 10 to cause CPU 16 to execute one or more software applications. The software applications that execute on CPU 16 may include, for example, a graphical user interface application or another program. As an example, CPU 16 may execute one or more software applications that generate image content for icons shown on one or more displays 28. As another example, in response to the user placing the automobile in reverse, CPU 16 may execute an application that causes camera processor 14 to process the image content captured by lens 12. As another example, CPU 16 may execute an application that generates image content indicating the battery level, fuel level, temperature, etc.

The above example applications that CPU 16 executes are examples where CPU 16 generates image content for display. However, there may be other example applications that CPU 16 executes that do not generate image content such as the operating system. Furthermore, rather than executing applications to generate the image content, CPU 16 may be hardwired to generate the image content. For instance, rather than executing an application on programmable circuitry to determine the fuel level based on information received from a fuel sensor, CPU 16 may be hardwired to determine the fuel level with specialized fixed-function circuitry that receive information from the fuel sensor and outputs information indicating the fuel level. In some cases, even in such examples, CPU 16 may execute an application that receives the information indicating the fuel level from the fixed-function circuitry and generates graphical commands so that GPU 18 can generate image content showing the fuel level.

There may be various combinations and permutations of using fixed-function and programmable circuitry for CPU 16 to generate information that is to be displayed on one or more displays 28. The above provide some examples, and such examples should not be considered limiting.

The software applications that execute on CPU 16 may include one or more graphics rendering instructions that instruct GPU 18 to cause the rendering of graphics data for storage in system memory 30 and/or for display on display 28. In some examples, the software instructions may conform to a graphics application programming interface (API), such as, e.g., an Open Graphics Library (OpenGL®) API, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

As one example, CPU 16 may determine the miles-per-gallon that the automobile is achieving, and generate graphics rendering instructions that instruct GPU 18 to generate image content showing the miles-per-gallon. As another example, the driver may be reversing the automobile, and in response, CPU 16 may cause one or more displays 28 to display image content capture by lens 12 (e.g., backup camera) and processed by camera processor 14. In addition, CPU 16 may determine angle of movement of the automobile, and generate graphical information showing the path of automobile in reverse. CPU 16 may generate graphics rendering instructions for GPU 18 to draw the path of the automobile that is superimposed on the images processed by camera processor 14. Accordingly, GPU 18 may be configured to generate image content for an automobile application while the automobile is in operation.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting images from camera processor 14 and GPU 18, etc. System memory 30 may additionally store information for use by and/or generated by other components of device 10. For example, system memory 30 may act as a device memory for camera processor 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some examples, system memory 30 may include instructions that cause camera processor 14, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., camera processor 14, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor 14, CPU 16, and GPU 18 may store image data, and the like in respective buffers that are allocated within system memory 30. Display interface 26 may retrieve the data from system memory 30 and configure display 28 to display the image represented by the generated image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Automobiles operate according to a high-level of safety compliance, and the ISO 26262 is the functional safety standard for road vehicles. Part of the operations of GPU 18, or other processors configured to generate visual content for display, may fall under the safety critical Advanced Driver Assistance Systems (ADAS). One of the ISO 26262 requirements for ADAS is ensuring integrity, typically through online (during operation) self-tests, for various hardware components involved in safety critical use cases, such as GPU 18.

This disclosure describes example techniques for concurrent and on-line field testing of hardware processing cores (such as the processing cores of GPU 18) and memories such as local memory 20. The field tests may be performed while as device 10 is in operation (e.g., while a vehicle in which device 10 is embedded is being driven). In general, the techniques of this disclosure include performing the same processing of data twice (e.g., operations for rendering or generally producing an image) using GPU 18 or another processor. The techniques of this disclosure are applicable for any type of processing of data performed to produce an image. In one example, the processing of data may include performing graphics operations (e.g., executing a graphics pipeline by GPU 18).

As will be described in more detail below, GPU 18 or other processor may be configured to store the results (e.g., intermediate results) of the graphics operations in one or more memories (e.g., one or more internal memories of the GPU) using different memory access patterns. The results (e.g., intermediate results and/or the final image) may then be compared to determine if any bits of the memory are different. If so, the graphic processing sub-system may identify an error in the one or more memories (e.g., internal memories of the graphics sub-system) and issue a warning (e.g., an interrupt). In the context of this disclosure, intermediate results may be any results produced by GPU 18 or another processor during the processing of the data to produce the image. For example, in the context of a graphics processing pipeline, the intermediate results may be any results produced by the various stages of a graphics pipeline.

In one example, GPU 18 may be configured to process data to produce a first image, including storing intermediate first results of processing the data in at least one internal memory of GPU 18 according to a first memory access pattern. GPU 18 may be further configured to process the same data to produce a second image, including storing intermediate second results of processing the data in the at least one internal memory of GPU 18 according to a second memory access pattern, wherein the second memory access pattern is different than the first memory access pattern. GPU 18, or another circuit, may be configured to compare the first image to the second image, and generate an interrupt if the comparison indicates that the first image is different than the second image.

The techniques of this disclosure may be useful to ensure that GPU 18 and associated memories (e.g., local memory 20 or other internal memories) are operational, without fault, for safety critical automotive applications such as ADAS, or applications like Instrument Cluster display systems, and surround view systems that use GPU 18. The techniques described in this disclosure may provide a systematic methodology to ensure integrity of logic of GPU 18 and local memory 20.

Figure 2:
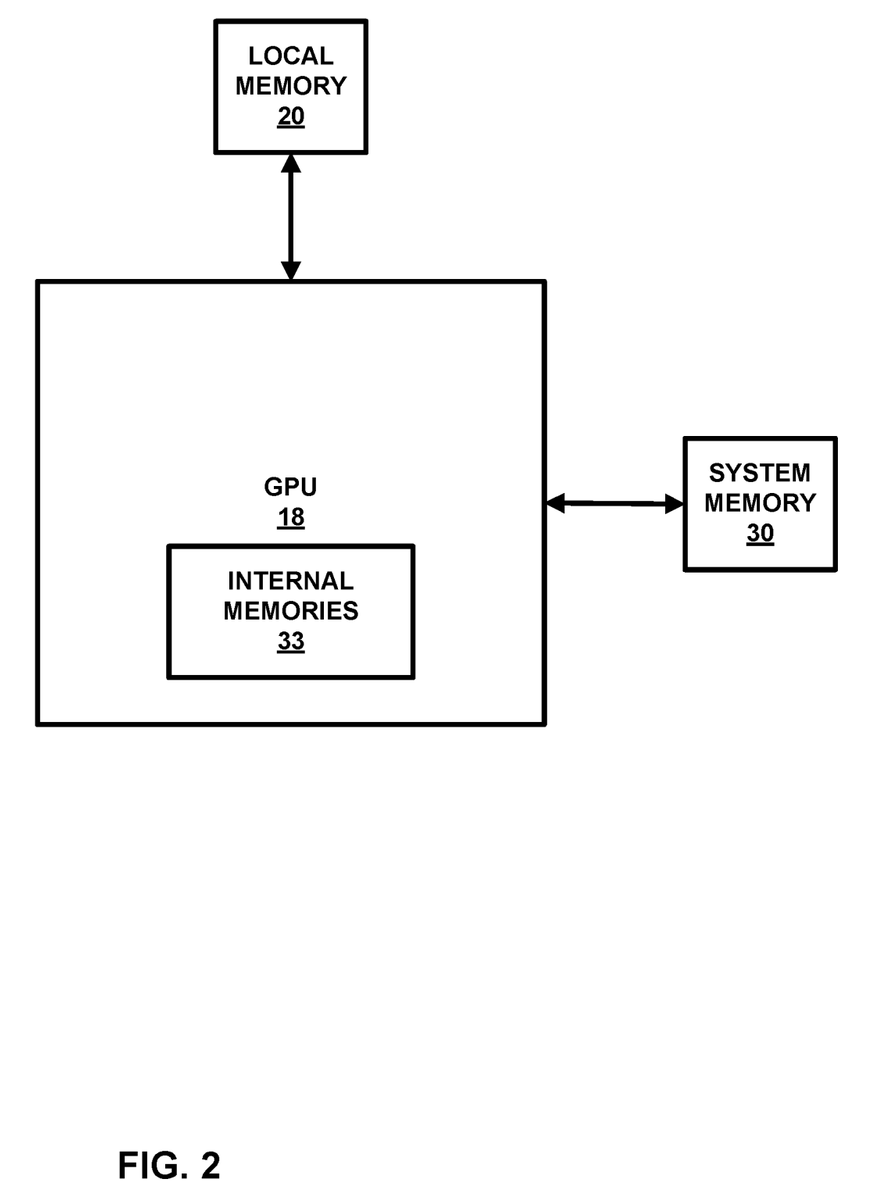
FIG. 2 is a block diagram illustrating a graphics processing unit in more detail

FIG. 2 shows an example of GPU 18 in more detail. While techniques of this disclosure will be described with reference to GPU 18, it should be understood that the techniques of this disclosure may be performed by one or more processors or processing circuits configured to generate visual content for display. For example, the techniques of this disclosure for determining data content integrity using memory addressing and/or memory flipping techniques may be implemented by display processor 11, camera processor 14, CPU 16, a DSP, a video decoder, or any other type of processor.

As shown in FIG. 2, in addition to local memory 20, GPU 18 may include one or more internal memories 33. Such internal memories 33 may include buffers, caches, and/or any other memory structure used to store data. Internal memories 33 may be used to store intermediate results produced when rendering or otherwise processing data to generate an image or frame for display. For example, internal memories 33 may be any number of caches, buffers, and/or other memories used to store the intermediate results produced by various stages of a 2D or 3D graphics pipeline (e.g., a rendering pipeline) executed by GPU 18. The intermediate results may include visibility streams, primitive lists, vertex information, tessellation information, pixel information, depth information, and the like. The intermediate results may also include the outputs of any graphics processing stage (e.g., vertex shader, tessellation, geometry shader, pixel shader, rasterizer, etc.). For non-graphics operations (e.g., for images produced by a processor other than GPU 18), the intermediate results may include any data that is produced and stored prior to the output of the final images. Final images for display generated by GPU 18 may be stored in local memory 20 and/or output to system memory 30. In one example, the final images produced by GPU 18 may include the entirety of the frame to be displayed on display(s) 28. In another example, GPU 18 may produce final images that may be composited and/or blended with other images for eventual display on display(s) 28. As discussed above, display processor 11 of FIG. 1 may be configured to perform such compositing and blending functions.

In accordance with techniques of this disclosure, GPU 18 (or another type of processor) may be configured to generate an image for display. For example, CPU 16 may execute instructions that cause GPU 18 to generate an image for display. In order to ensure the integrity of the content generated by GPU 18, and in order to detect if any hardware or memories in GPU 18 are operating correctly, GPU 18 may be configured to generate the image twice (e.g., a first image and a second image). GPU 18 may be configured to generate each of the first image and the second image using the same input data. As such, it is expected that the first image and the second image will be identical.

While generating the first image, GPU 18 may be configured to store results (e.g., intermediate results or final results) produced from the generation of the first image into one or more memories using a first memory access pattern. Likewise, while generating the second image, GPU 18 may be configured to store results (e.g., intermediate results or final results) produced from the generation of the second image into one or more memories using a second memory access pattern. In one example, the first memory access pattern refers to the memory access pattern used for intermediate results (e.g., intermediate first results) relating to generating the first image and the second memory access pattern relates to the memory access pattern used for intermediate results (e.g., intermediate second results) relating to generating the second image. As will be described below, the first and second memory access patterns are different, such that the intermediate results for the second image are stored in different physical addresses of one or more memories (e.g., internal memories 33 or local memory 20) as compared to the intermediate results for the first image. GPU 18, or another processor, are not limited to using the first and second memory access patterns for intermediate results only. In some examples, the first and second memory access patterns may also be used when storing the final images.

In general, a memory access pattern may define internal address bits used to store data (whether intermediate or final results) of generating an image in the one or more memories to which GPU 18 writes data (e.g., internal memories 33, local memory 20, etc.). The memory access pattern may define both the bits of a memory used to store data, as well as the order data is stored in the bits of a memory.

Figure 3A:
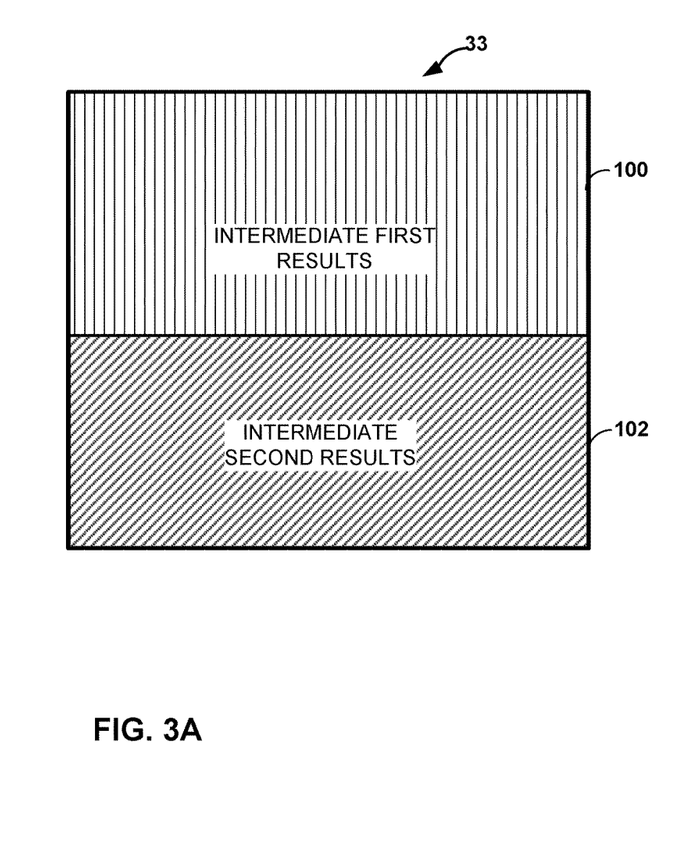
FIGS. 3A and 3B are conceptual diagrams illustrating example memory access patterns according to examples of this disclosure.

FIG. 3A shows one example of different memory access patterns. As shown in FIG. 3A, GPU 18 may use a first memory access pattern 100 to write the intermediate first results to a first portion of a memory of internal memories 33. GPU 18 may use a second memory access pattern 102 to write the intermediate second results to a second portion of a memory of internal memories 33. In this example, the intermediate first results are stored in at least one memory of internal memories 33 according to first memory access pattern 100 and the intermediate second results are stored in the at least one memory of internal memories 33 according to second memory access pattern 102. As such, GPU 18 stores the intermediate results of processing the first image in completely different bits of local memory 20 as compared to the intermediate results of processing second image.

As shown in the example of FIG. 3A, GPU 18 may be configured to use a first memory access pattern and a second memory access pattern for at least one memory of internal memories 33. GPU 18 may be configured to use the two different memory access patterns for a subset of internal memories 33 or for all of internal memories 33. GPU 18 may also be configured to store the final results (e.g., the first image and the second image) into local memory 20 and/or system memory 30 using the first and second memory access patterns described in this disclosure. That is, the techniques of this disclosure are not limited to using different memory access patterns for storing intermediate results on internal memories of a processor (e.g., GPU 18), but may also be used for external memories that store final images.

In one example, GPU 18 may be configured to use the first memory access pattern or the second memory access pattern according to a memory setting. In one example, the memory setting may be a single bit called "FLIP." If FLIP is set to zero, the first memory access pattern is used. If FLIP is set to one, the second memory access pattern is used, or vice versa. In general, the values of the FLIP bit may change the memory access pattern. In one example, a FLIP value of 1 changes or flips (e.g., changes a 0 to a 1 or vice versa) one address bit internal to internal memories 33 and/or local memory 20 such that data is stored in different physical bits for a given address when the FLIP setting is zero versus when the FLIP setting is one.

In some examples of this disclosure, GPU 18 may be configured to always render two images/frames in response to an instruction to render an image/frame. GPU 18 may be configured to automatically render the first image using FLIP=0, and render the second image using FLIP=1. In other examples, the FLIP bit may be set through an instruction received from CPU 16. For example, CPU 16 may execute a graphics driver that controls the FLIP setting.

Figure 3B:
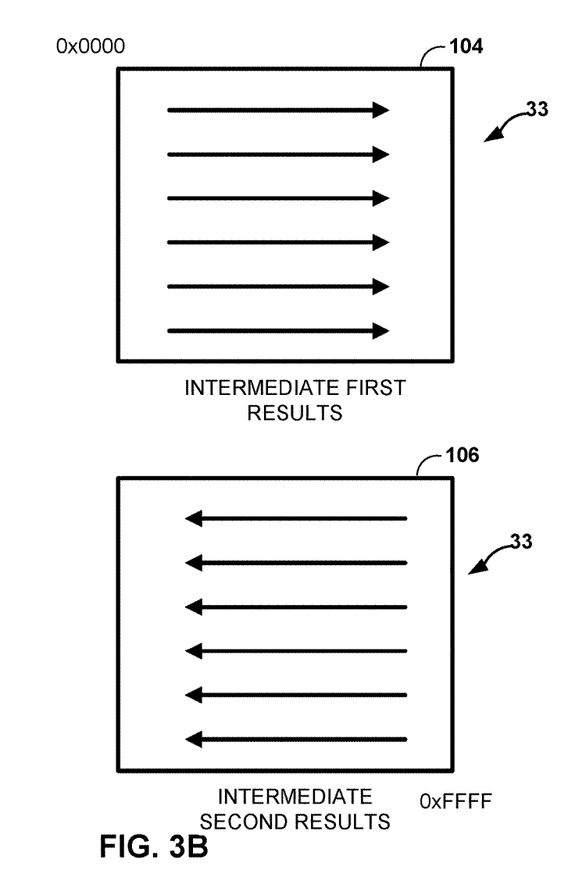

In the example of FIG. 3B, GPU 18 is configured to store the intermediate first results and the intermediate second results in the same bits of a memory of internal memories 33. However, GPU 18 is configured to write the pixel values of the intermediate first results and the intermediate second results into the bits of the at least one memory of internal memories 33 in a different order. For example, GPU 18 may store pixel values (or other intermediate results, such as vertex information) of the intermediate first results into bits of internal memories 33 according to a first memory access pattern that starts at address 0x000 of internal memories 33 and proceeds in a raster scan order. GPU 18 may store pixel values (or other intermediate results, such as vertex information) of the intermediate second results into bits of internal memories 33 according to a second memory access pattern that starts at address 0xFFFF and proceeds in a reverse raster scan order.

As such, in the example of FIG. 3B, the intermediate first results and the intermediate second results each use the same totality of bits in internal memories 33. However, the corresponding individual pieces of data of each of the intermediate first results and the intermediate second results are stored in different individual bits of internal memories 33 because the intermediate first results and intermediate second results are written to internal memories 33 according to different memory access patterns that write data in different orders. For example, a first memory access pattern may have a raster scan order, while a second memory access pattern has a reverse raster scan order.

GPU 18 may use the first memory access pattern and the second memory access pattern for any of the memories to which GPU 18 writes data. In some examples, GPU 18 may write data according to the first and second memory access patterns on intermediate results stored in one or more of internal memories 33 and/or local memory 20. In other examples, GPU 18 may use the first and second memory access patterns on the results of generating the final image stored in local memory 20 and/or system memory 30. In other examples, GPU 18 may use the first and second memory access patterns on both intermediate results and on the results of the final image stored on any of internal memories 33, local memory 20, and/or system memory 30. In each of the examples above, GPU 18 may apply the first and second memory access patterns to a subset of memories to which GPU 18 writes data or to all of the memories to which GPU 18 writes data.

After processing data to produce the first and second images (e.g., rendering a frame), and storing the results according to the two different memory access patterns, GPU 18 may be configured to compare the two images. As mentioned above, as the two images are produced using the same input data, the two output images (i.e., the first image and the second image) are expected to be the same.

In one example, GPU 18 (or another processing circuit) may be configured to compare the first image and the second image on a pixel by pixel basis. If any pixel values of the two images are different, a fault may be detected, and GPU 18 may issue an interrupt.

In another example, rather than comparing each of the images on a pixel by pixel basis, GPU 18 may be configured to compute a data integrity check value for each of the images. Such a data integrity check value may be a cyclic redundancy check (CRC) code, a checksum, a hash value or other type of value generated to check the validity of raw data (e.g., image data). A CRC code is an error-detecting code that is often used to detect changes in data. CRCs are generated using cycle codes that produce a value that is a function of one or more characteristics of the raw data (e.g., image data). A hash function is a function that maps data of an arbitrary size to data of a fixed size. Hash functions are sometimes used in a hash table for accelerated lookup of duplicated records. Hash functions may also be used to generate data integrity check values for image data before and after processing. A checksum is data produced by an algorithm operating on data (e.g., image data) in order to detect errors during transmission, processing, or storage. In other examples, such a check value may be a multiple independent signature register (MISR), a linear feedback shift register (LFSR), and the like, though other techniques may be used.

In one example, GPU 18 (or another processing circuit) may simply compare data check integrity values of the first image and the second image to determine whether or not they are different. GPU 18 may be configured to generate an interrupt if the data integrity check values of the first image and the second image are different. In other examples, GPU 18 may be configured to only issue an interrupt if a threshold number of contiguous comparisons (e.g., comparisons of data integrity check values for contiguous frames) in a row all indicate an error. Accordingly, in this example, the threshold may be the number of contiguous errors detected before GPU 18 generates an interrupt indicating an error.

In response to the interrupt, computing device 10 may issue an audible, visible, and/or haptic warning to the user. In other examples, in response to the interrupt, computing device 10 may also initiate a self-recovery processor in which error produced by GPU 18 may be repaired.

In the above examples, pixels or data integrity check values of the first image and the second image are compared to determine if there has been any error introduced by the hardware components of GPU 18 or any error introduced by one or more of internal memories 33, local memory 20, and/or system memory 30. In other examples of the disclosure, GPU 18 may also be configured to compare intermediate results (including data integrity check values for intermediate results) at each of the one or more internal memories 33 for each of the two images that are generated.

For example, GPU 18 may process data to produce the first image and may store each the intermediate results (e.g., intermediate first results) in system memory 30. As with the examples above, the intermediate first results are initially stored in the one or more internal memories 33 using a first memory access pattern. GPU 18 may then process data to produce the second image, writing another set of intermediate results (e.g., intermediate second results) to the one or more internal memories 33 using a second memory access pattern. The intermediate second results may remain in the one or more internal memories 33 or may also be written to system memory 30. Rather than just comparing the final two images, GPU 18 may compare each of the intermediate first results to each of the corresponding intermediate second results. That is, the intermediate results produced during the processing of each image are saved and compared. As noted above, the comparison may be performed directly on the data of the intermediate first results (e.g., vertex values, pixel values, depth values, etc.), or may be a comparison of data integrity check values produced from the intermediate results.

In this example, corresponding intermediate first results and corresponding second results are intermediate results that are written to the same particular memory, buffer, and/or cache of the one or more internal memories 33. If the comparison of a particular pair of corresponding intermediate first results and intermediate second results indicates an error (i.e., the corresponding intermediate results are not the same), GPU 18 may determine which of the one or more internal memories 33 produced the error. In addition, particular memories, caches, and buffers of the one or more internal memories 33 may be associated with particular hardware components and/or graphics processing pipelines of GPU 18. As such, GPU 18 may be able to localize errors to specific hardware components, pipelines, and/or memories. In this example, in addition to issuing an interrupt indicating an error, GPU 18 may also generate data that indicates which of the one or more internal memories 33 produced the error.

GPU 18 (or another processor) may perform concurrent online testing using the techniques discussed above. In other words, GPU 18 may perform a built-in self-test while GPU 18 is powered-on and rendering images. Because GPU 18 performs the built-in self-test concurrently and online, GPU 18 does not perform the built-in self-test by entering into a dedicated test mode. If GPU 18 determines that, during the built-in self-test, GPU 18 has modified an image in an unexpected way (e.g., a checksum for a first image does not match a checksum for a second image), GPU 18 may determine that one or more hardware units or memories accessible by GPU 18 are not operating properly, and may thereby detect a fault in GPU 18.

The techniques described above allow data integrity to be confirmed without using error-correcting code (ECC) memory, which is often not present in display subsystems, including GPUs. In addition, the techniques of this disclosure may be used during normal system operation without entering a dedicated test mode. Furthermore, the techniques of this disclosure may be implemented with minimal impact to die area of an SoC. Also, the techniques of this disclosure may be implemented and employed at the full processing speed of GPU 18 (or another processor). That is, the data integrity checks may occur concurrently with actual operation of computing device 10. The data integrity checks of this disclosure are able to detect both permanent faults and intermittent faults because data integrity testing may be done concurrently and online. In addition, the data integrity checks of this disclosure may enable vehicle manufacturers and vehicle systems manufacturers to achieve hardware architectural metrics as per ISO 26262 functional safety standard (Single Point Fault Metric (SPFM) and Latent Point Fault Metric (LPFM)).

Figure 4:
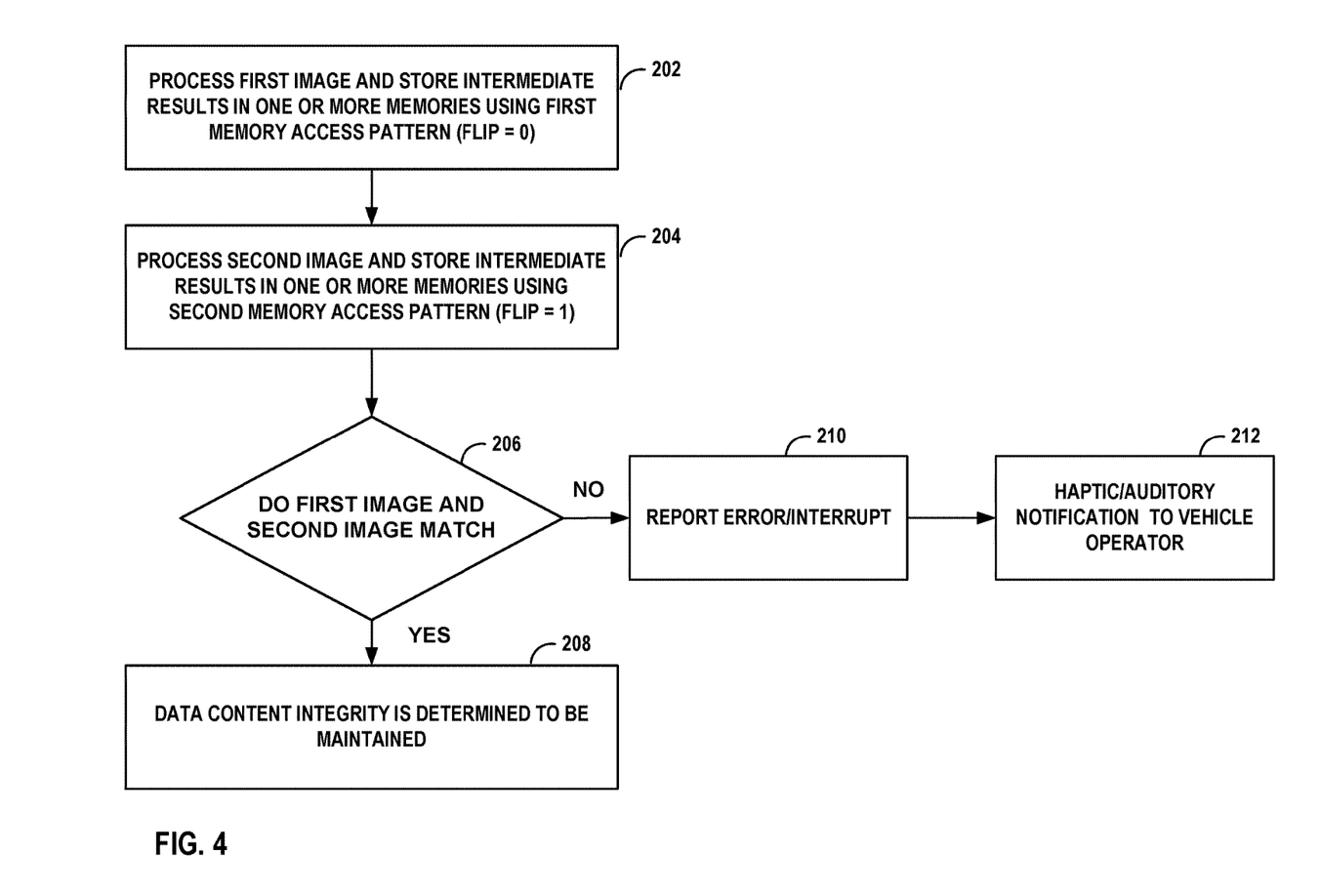
FIG. 4 is a flowchart illustrating an example method of this disclosure.

FIG. 4 is a flowchart illustrating another example method of this disclosure. The techniques of FIG. 4 may be performed by GPU 18 and/or any other processing circuit or processor configured to generate image data for display.

In one example, GPU 18 may be configured to process data to produce a first image, including storing intermediate first results of processing the data in at least one internal memory of the one or more processors according to a first memory access pattern (e.g., FLIP=0) (202). GPU 18 may be further configured to process the data to produce a second image, including storing intermediate second results of processing the second image in at the least one internal memory of the one or more processors according to a second memory access pattern (e.g., FLIP=1) (204). In this example, the second memory access pattern is different than the first memory access pattern. GPU 18 may be configured to store the first image and the second image in a memory (e.g., system memory 30). As discussed above, the data processed by GPU 18 is the same for each of the first image and the second image, so it is expected that the first image and the second image are the same. For example, the data may be graphics data used to render a frame comprising the first image or the second image.

GPU 18 may then be configured to determine if the first image and the second image match (206). If yes, GPU 18 may determine that the content integrity of the images is determined to be maintained (208). Computing device 10 may further include a display configured to display one of the first image or the second image if the comparison indicates that the first image is the same as the second image. If GPU 18 determines that the first image and the second image do not match, GPU 18 may report an error/interrupt (210) and computing device 10 may issue a haptic/auditory/visual/notification to the vehicle operator (212). In other words, GPU may compare the first image to the second image and generate an interrupt if the comparison indicates that the first image is different than the second image.

In one example of the disclosure, the first memory access pattern defines first internal address bits, used to store the intermediate first results, of the at least one internal memory. The second memory access pattern defines second internal address bits, used to store the intermediate second results, of the at least one internal memory, wherein the second internal address bits are different than the first internal address bits such that the intermediate second results are stored in different physical addresses of the at least one internal memory as compared to the intermediate first results.

In another example of the disclosure, GPU 18 is configured to compare values of each pixel of the first image to corresponding values of each corresponding pixel of the second image, and generate the interrupt in the case that the value of at least one pixel of the first image does not match the corresponding value of the corresponding pixel of the second image.

In another example of the disclosure, GPU 18 is configured to generate a first data integrity check value for the first image, and generate a second data integrity check value for the second image. GPU 18 is further configured to compare the first data integrity check value to the second data integrity check value, and generate the interrupt if the comparison indicates that the first data integrity check value and the second data integrity check value do not match within a predetermined margin of error. In one example, the first data integrity check value and the second data integrity check value are one of a cyclic redundancy check (CRC) code, a hash function, a checksum, or a multiple independent signature register (MISR) signature.

In another example of the disclosure, GPU 18 may be further configured to generate a first data integrity check value for one or more of the intermediate first results, generate a second data integrity check value for one or more of the intermediate second results, compare the first data integrity check value to the second data integrity check value, and generate the interrupt if the comparison indicates that the first data integrity check value and the second data integrity check value do not match within a predetermined margin of error.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method for graphics processing, the method comprising:

processing data using one or more processors to produce a first image, including storing intermediate first results of processing the data in at least one internal memory of the one or more processors according to a first memory access pattern;

processing the data using the one or more processors to produce a second image, including storing intermediate second results of processing the data in the at least one internal memory of the one or more processors according to a second memory access pattern, wherein the second memory access pattern is different than the first memory access pattern;

storing the first image and the second image in a memory;

comparing the first image to the second image; and
generating an interrupt if the comparison indicates that the first image is different than the second image
wherein the first memory access pattern defines first internal address bits, used to store the intermediate first results, of the at least one internal memory, and wherein the second memory access pattern defines second internal address bits, used to store the intermediate second results, of the at least one internal memory, wherein the second internal address bits are different than the first internal address bits such that the intermediate second results are stored in different physical addresses of the at least one internal memory as compared to the intermediate first results.

2. The method of claim 1, further comprising:
displaying one of the first image or the second image if the comparison indicates that the first image is the same as the second image.

3. The method of claim 1, wherein the one or more processors comprise a graphics processing unit (GPU), and wherein the data is graphics data used to render a frame comprising the first image or the second image.

4. The method of claim 1, wherein comparing the first image to the second image comprises comparing values of each pixel of the first image to corresponding values of each corresponding pixel of the second image, and
wherein generating the interrupt comprises generating the interrupt in the case that the value of at least one pixel of the first image does not match the corresponding value of the corresponding pixel of the second image.

5. The method of claim 1, further comprising:
generating a first data integrity check value for the first image; and
generating a second data integrity check value for the second image,
wherein comparing the first image to the second image comprises comparing the first data integrity check value to the second data integrity check value, and
wherein generating the interrupt comprises generating the interrupt if the comparison indicates that the first data integrity check value and the second data integrity check value do not match within a predetermined margin of error.

6. The method of claim 5, wherein the first data integrity check value and the second data integrity check value are one of a cyclic redundancy check (CRC) code, a hash function, a checksum, or a multiple independent signature register (MISR) signature.

7. The method of claim 1, wherein the memory includes a first memory and a second memory, the method further comprising:
storing the first image in the first memory according to the first memory access pattern; and
storing the second image in the second memory according to the second memory access pattern.

8. The method of claim 1, further comprising:
generating a first data integrity check value for one or more of the intermediate first results; and
generating a second data integrity check value for one or more of the intermediate second results,
wherein comparing the first image to the second image comprises comparing the first data integrity check value to the second data integrity check value, and
wherein generating the interrupt comprises generating the interrupt if the comparison indicates that the first data integrity check value and the second data integrity check value do not match within a predetermined margin of error.

9. The method of claim 1, further comprising:
generating one or more of an auditory, visual, or haptic warning in response to generating the interrupt.

10. The method of claim 1, further comprising:
initiating a recovery process in response to generating the interrupt.

11. The method of claim 1, wherein the one or more processors are part of an advanced driver assistance system (ADAS) of a vehicle.

12. An apparatus configured for graphics processing, the apparatus comprising:
at least one internal memory; and
one or more processors in communication with the at least one internal memory, the one or more processors configured to:
process data to produce a first image, including storing intermediate first results of processing the data in the at least one internal memory according to a first memory access pattern;
process the data to produce a second image, including storing intermediate second results of processing the data in the at least one internal memory according to a second memory access pattern, wherein the second memory access pattern is different than the first memory access pattern;
store the first image and the second image in a memory;
compare the first image to the second image; and
generate an interrupt if the comparison indicates that the first image is different than the second image
wherein the first memory access pattern defines first internal address bits, used to store the intermediate first results, of the at least one internal memory, and wherein the second memory access pattern defines second internal address bits, used to store the intermediate second results, of the at least one internal memory, wherein the second internal address bits are different than the first internal address bits such that the intermediate second results are stored in different physical addresses of the at least one internal memory as compared to the intermediate first results.

13. The apparatus of claim 12, further comprising:
a display configured to display one of the first image or the second image if the comparison indicates that the first image is the same as the second image.

14. The apparatus of claim 12, wherein the one or more processors comprise a graphics processing unit (GPU), and wherein the data is graphics data used to render a frame comprising the first image or the second image.

15. The apparatus of claim 12, wherein to compare the first image to the second image, the one or more processors are further configured to compare values of each pixel of the first image to corresponding values of each corresponding pixel of the second image, and
wherein to generate the interrupt, the one or more processors are further configured to generate the interrupt in the case that the value of at least one pixel of the first image does not match the corresponding value of the corresponding pixel of the second image.

16. The apparatus of claim 12, wherein the one or more processors are further configured to:
generate a first data integrity check value for the first image; and
generate a second data integrity check value for the second image, wherein to compare the first image to the second image, the one or more processors are further configured to compare the first data integrity check value to the second data integrity check value, and wherein to generate the interrupt, the one or more processors are further configured to generate the interrupt if the comparison indicates that the first data integrity check value and the second data integrity check value do not match within a predetermined margin of error.

17. The apparatus of claim 16, wherein the first data integrity check value and the second data integrity check value are one of a cyclic redundancy check (CRC) code, a hash function, a checksum, or a multiple independent signature register (MISR) signature.

18. The apparatus of claim 12, wherein the memory includes a first memory and a second memory, and wherein the one or more processors are further configured to:
store the first image in the first memory according to the first memory access pattern; and
store the second image in the second memory according to the second memory access pattern.

19. The apparatus of claim 12, wherein the one or more processors are further configured to:
generate a first data integrity check value for one or more of the intermediate first results; and
generate a second data integrity check value for one or more of the intermediate second results,
wherein to compare the first image to the second image, the one or more processors are further configured to compare the first data integrity check value to the second data integrity check value, and
wherein to generate the interrupt, the one or more processors are further configured to generate the interrupt if the comparison indicates that the first data integrity check value and the second data integrity check value do not match within a predetermined margin of error.

20. The apparatus of claim 12, wherein the one or more processors are further configured to:
generate one or more of an auditory, visual, or haptic warning in response to generating the interrupt.

21. The apparatus of claim 12, wherein the one or more processors are further configured to:
initiate a recovery process in response to generating the interrupt.

22. The apparatus of claim 12, wherein the one or more processors are part of an advanced driver assistance system (ADAS) of a vehicle.

23. An apparatus configured for graphics processing, the apparatus comprising:
means for processing data using one or more processors to produce a first image, including storing intermediate first results of processing the data in at least one internal memory of the one or more processors according to a first memory access pattern;
means for processing the data using the one or more processors to produce a second image, including storing intermediate second results of processing the data in the at least one internal memory of the one or more processors according to a second memory access pattern, wherein the second memory access pattern is different than the first memory access pattern;
means for storing the first image and the second image in a memory;
means for comparing the first image to the second image; and means for generating an interrupt if the comparison indicates that the first image is different than the second image
wherein the first memory access pattern defines first internal address bits, used to store the intermediate first results, of the at least one internal memory, and wherein the second memory access pattern defines second internal address bits, used to store the intermediate second results, of the at least one internal memory, wherein the second internal address bits are different than the first internal address bits such that the intermediate second results are stored in different physical addresses of the at least one internal memory as compared to the intermediate first results.

24. The apparatus of claim 23, wherein the means for comparing the first image to the second image comprises means for comparing values of each pixel of the first image to corresponding values of each corresponding pixel of the second image, and
wherein the means for generating the interrupt comprises means for generating the interrupt in the case that the value of at least one pixel of the first image does not match the corresponding value of the corresponding pixel of the second image.

25. The apparatus of claim 23, further comprising:
means for generating a first data integrity check value for the first image; and
means for generating a second data integrity check value for the second image,
wherein the means for comparing the first image to the second image comprises means for comparing the first data integrity check value to the second data integrity check value, and
wherein the means for generating the interrupt comprises means for generating the interrupt if the comparison indicates that the first data integrity check value and the second data integrity check value do not match within a predetermined margin of error.

26. A non-transitory computer-readable storage medium storing instructions that, when executed, causes one or more processor to:
process data to produce a first image, including storing intermediate first results of processing the data in at least one internal memory of the one or more processors according to a first memory access pattern;
process the data to produce a second image, including storing intermediate second results of processing the data in the at least one internal memory of the one or more processors according to a second memory access pattern, wherein the second memory access pattern is different than the first memory access pattern;
store the first image and the second image in a memory;
compare the first image to the second image; and
generate an interrupt if the comparison indicates that the first image is different than the second image
wherein the first memory access pattern defines first internal address bits, used to store the intermediate first results, of the at least one internal memory, and wherein the second memory access pattern defines second internal address bits, used to store the intermediate second results, of the at least one internal memory, wherein the second internal address bits are different than the first internal address bits such that the intermediate second results are stored in different physical addresses of the at least one internal memory as compared to the intermediate first results.

27. The non-transitory computer-readable storage medium of claim 26, wherein to compare the first image to the second image, the instructions further cause the one or more processors to compare values of each pixel of the first image to corresponding values of each corresponding pixel of the second image, and
- wherein to generate the interrupt, the instructions further cause the one or more processors to generate the interrupt in the case that the value of at least one pixel of the first image does not match the corresponding value of the corresponding pixel of the second image.

28. The non-transitory computer-readable storage medium of claim 26, wherein the instructions further cause the one or more processors to:
- generate a first data integrity check value for the first image; and
- generate a second data integrity check value for the second image,
- wherein to compare the first image to the second image, the instructions further cause the one or more processors to compare the first data integrity check value to the second data integrity check value, and
- wherein to generate the interrupt, the instructions further cause the one or more processors to generate the interrupt if the comparison indicates that the first data integrity check value and the second data integrity check value do not match within a predetermined margin of error.

* * * * *